United States Patent [19]

Frost

[11] Patent Number: 5,387,661
[45] Date of Patent: Feb. 7, 1995

[54] POLYMERIZABLE COMPOSITIONS

[75] Inventor: George W. Frost, Afton, Minn.

[73] Assignee: Minnesota Mining and Manufacturing Company, St. Paul, Minn.

[21] Appl. No.: 242,373

[22] Filed: May 13, 1994

[51] Int. Cl.$^6$ ............ C08F 4/26; C08F 4/12; C08F 224/00; C08F 220/10; C08F 216/12

[52] U.S. Cl. .................. 526/90; 526/154; 526/273; 526/328.5; 526/332; 526/172; 526/283

[58] Field of Search ............. 526/90, 154, 273, 328.5, 526/332, 172, 283

[56] References Cited

U.S. PATENT DOCUMENTS

| | | | |
|---|---|---|---|
| 4,197,225 | 4/1980 | Emmons et al. | 260/23 AR |
| 4,400,413 | 8/1983 | Emmons et al. | 427/136 |
| 4,463,117 | 7/1984 | Malin | 524/260 |
| 4,910,080 | 3/1990 | Frost | 428/307.3 |

Primary Examiner—Joseph L. Schofer
Assistant Examiner—Wu C. Cheng
Attorney, Agent, or Firm—Gary L. Griswold; Walter N. Kirn; Robert W. Sprague

[57] ABSTRACT

Polymerizable compositions comprising (a) hydroxypropyl methacrylate; (b) a $C_8$ to $C_{10}$ alkyl ester of acrylic or methacrylic acid; (c) a crosslinking agent; (d) a promoter; and (e) a free-radical initiator.

9 Claims, No Drawings

POLYMERIZABLE COMPOSITIONS

FIELD OF THE INVENTION

This invention relates to polymer compositions.

BACKGROUND OF THE INVENTION

Polymer concrete compositions comprising dicyclopentenyl acrylate or methacrylate and an alkyl acrylate or methacrylate, and compositions comprising a dicyclopentenyloxyalkyl acrylate or methacrylate and a hydroxy-alkyl methacrylate are described in U.S. Pat. Nos. 4,197,225 and 4,400,413, respectively. Impregnating compositions comprising dicyclopentenyl acrylate or methacrylate and an alkyl acrylate or methacrylate are described in U.S. Pat. No. 4,910,080.

SUMMARY OF THE INVENTION

The present invention provides novel, low odor, low viscosity, high flash point compositions comprising:

(a) a major amount of hydroxypropyl methacrylate;
(b) a major amount of $C_8$ to $C_{10}$ alkyl ester of acrylic or methacrylic acid;
(c) a crosslinking agent selected from the group consisting of a polyallyl glycidyl ether resin and dicyclopentyl ethoxy methacrylate;
(d) a promoter comprising cobalt metal ion; and
(e) a free-radical initiator for polymerizing components (a), (b) and (c).

The compositions of the invention are useful in the protection of concrete surfaces and the repair of concrete.

Depending upon the intended use of the composition of the invention, the compositions may further include filler such as a powder or granular aggregate such as in the case where the composition is to be used to repair larger concrete cracks, etc.

Method of using the compositions of the invention are also described.

DETAILED DESCRIPTION

Component (a) of the compositions of the invention is the monomer hydroxypropyl methacrylate.

Examples of suitable acrylic acid or methacrylic acid esters for use as component (b) of the composition include the esters of acrylic acid or methacrylic acid with $C_8$ to $C_{10}$ alcohols. Specific examples of preferred esters are iso-octyl acrylate and iso-decyl methacrylate.

Component (c) of-the compositions of the invention is a crosslinking agent selected from the group consisting of a polyallyl glycidyl ether resin and dicyclopentyl ethoxy methacrylate.

Monomer components (a) and (b) will preferably be present in amounts of about 20 to 80 and about 80 to 20 parts by weight, respectively, both based on 100 parts by weight of the total amount of monomer components (a), (b) and (c). Component (c) will preferably be present in an amount of about 5 to 30 parts by weight per 100 parts by weight of the total amount by weight of components (a), (b) and (c).

The free radical initiator that may be used in the composition of this invention as component (e) is any polymerization agent that will furnish free radicals under polymerization conditions. The initiator is used in an amount effective to produce substantially complete polymerization of components (a), (b) and (c) at ambient temperature within less than about 24 hours. Preferably, the free radical initiator is present in an amount that is about 0.05 to 5 parts by weight per 100 parts by weight of the total amount of components (a), (b) and (c). Particularly preferred initiators are organic peroxy compounds such as benzoyl peroxide and cumene hydroperoxide. The free radical initiator may be a photoinitiator, which is an agent that is sensitive to ultraviolet light as would be provided in sunlight or in UV lamps. Examples of such a photoinitiator are acetophenones, such as 2,2-dimethoxy-2-phenylacetophenone (commercially available as Irgacure 651 from Ciba-Geigy Corp., Hawthorne, N.Y.) and diethoxyacetophenone; benzil; and benzoin ethers.

The composition of the invention may contain mixtures of two or more different free radical initiators. For example, both an organic peroxy compound and a photoinitiator may be utilized to provide a rapid cure with particularly rapid cure of the outermost layer of the coating from exposure to light.

A metal promoter as component (d) is incorporated in the composition in an amount effective to enhance speed and completeness of cure of the composition. Thus, when only a photoinitiated free radical initiator is utilized, the incorporation of the metal promoter is particularly desirable to assure complete cure of the composition throughout the permeated concrete. When the free radical initiator is an organic peroxide, the additional use of the metal promoter is desirable to provide a more rapid cure of the polymer than would be possible in the absence of the metal promoter. Typically, the metal promoter is present in the composition in amounts such that metal is present in about 0.0005 to 2 parts by weight per 100 parts by weight of the total amount of components (a), (b) and (c).

The metal promoter employed as component (c) comprises cobalt metal ion. Preferably, the metal promoter comprises both cobalt and aluminum salts of inorganic acids or aliphatic acids and oxides of the metals. Examples of such salts include the chloride, nitrate, borate, sulfate, acetate, acetyl acetonate, propionate, butyrate, pentanoate, octoate, hexoate and naphthenate. Additionally, the metal promoter may include the salt of such complex acids as resinic acid, tall oil fatty acids, linseed oil fatty acids, lauric acids, palmitic acid, myristic acid, stearic acid, oleic acid, linoleic acid, linolenic acid, behenic acid, cerotic acid, montanic acid and abietic acid.

When the composition of the invention is stored in the presence of the metal promoter, the compositions may also contain a volatile reaction inhibitor to prevent premature polymerization of components (a), (b) and (c) before application to the desired substrate. Because these inhibitors are volatile, they dissipate in the air upon application of the composition to the substrate and no longer inhibit the polymerization reaction. Preferred inhibitors include volatile oximes such as methylethyl ketone-oxime, methylbutyl ketone-oxime, 5-methyl-3-heptanone-oxime, cyclohexanone-oxime and butyraldehyde-oxime. Volatile reaction inhibitors are present in an effective amount, preferably in amounts of about 0.1 to 2 parts by weight per 100 parts by weight of the total amount of components (a), (b) and (c).

The filler which may be employed in the compositions of the present invention are well known to those skilled in the art and include conventional materials ranging from powders to granular aggregate. Examples of suitable fillers are pebbles, sand or other large and small aggregates used in preparing concrete. Other generally high modulus inorganic silicaneous materials may be employed. Still further, examples of suitable fillers are glass bubbles or beads, colorquartz, carbon black, pigments and fumed silica. Preferably the filler will have a void volume of less than about 25%. Further, preferably the filler comprises a mixture of large, small and fine filler to provide higher compressive strengths than ordinarily obtained if only a filler of one size is employed.

Typically, the filler will be present in an amount of about 300 to 2000 parts by weight, and preferably will be present in an amount of about 550 to 900 parts by weight per 100 parts by weight of the total amount of components (a), (b) and (c).

Preferably the composition of the invention also includes a wax to facilitate surface cure.

The composition of the present invention may additionally comprise further additives, such as coloring agents, stabilizers, thickeners, rheological modifiers, preservatives or anticorrosive agents.

Low modulus compositions of the invention when hardened and aged at 55° C. for 14 days preferably provide materials having a tensile modulus of no greater than 50,000 kps and high modulus compositions of the invention are those therefore which when hardened and aged as above provide materials having a tensile modulus of at least 50,000 kps.

The composition of the present invention is typically provided as a three-part mixture comprising components (a), (b) and (c) in the indicated ratios in one container, the metal promoter (d) in a second container, and the free radical initiator (e) in a third container. Any filler employed would be contained in a fourth container. The free radical initiator should not be combined with the metal drier combination without components (a), (b) and (c) present due to the violent reaction that would ensue. Alternatively, this composition may be provided as a two-part system. In such a system, the components (a), (b) and (c) are provided in one container, optionally together with the metal promoter (d) and a stabilizer. The free radical reaction initiator (e) is provided in a second container and is mixed together with monomer components (a), (b) and (c) at the site of application together with any filler which may be employed.

The compositions of the invention are useful in the surface treatment or penetration of concrete. In such an application a traction coating of sand may be employed which is applied to the surface of the coating after it has been spread. The compositions of the invention are also useful in the repair of concrete such as filling cracks, etc. In the latter applications, inclusion of filler may be desirable particularly in the case of repair of larger cracks.

In the following examples, all compositions are reported in parts by weight.

EXAMPLES 1–2

Three component monomer-resin blends were prepared from hydroxypropyl methacrylate, HPMA, (Rocryl TM 410, Rohm & Haas, Philadelphia, Pa.), isodecyl methacrylate, IDMA, (Rocryl TM 310, Rohm & Haas, Philadelphia, Pa.) and poly allyl glycidyl ether resin, PAGE, (Santolink TM XI-100, Monsanto Co., St. Louis, Mo.). The proportions that were blended and mixed are shown in TABLE 1 below. To each monomer-resin blend, a paraffinic wax (Eskar TM 25, Amoco Chemicals, Chicago, Ill.) was melted into the mixture at 60° C. at the two levels specified in TABLE 1. A cobalt promoter (Copac TM, Huls America, Inc., Piscataway, N.J.) and an aluminum promoter (ADC TM 1020, OMG, Cleveland, Ohio) were added and mixed into the solution blend. To begin the curing, 3 parts of cumene hydroperoxide (83%; Elf Atochem, Philadelphia, Pa.) was added per 100 parts of the promoter/monomer/resin/wax blend.

The evaluation results of the respective high and low modulus compositions of the Examples are recorded in TABLE 2. Solution viscosities were determined at 20° C. with a Brookfield TM Viscometer using the ultralow viscosity adaptor kit and operated at 100 rpm. The flash points shown were the closed cup values in °F. Cure results were determined by pouring the mixed compositions into a 20×30 cm aluminum tray, so that the resulting coating was about 2 mm thick. The time in hours recorded was that required to reach a non-tacky surface finish at 20° C. Tensile strengths and property stability were determined by molding tensile dumbbells and testing per ASTM D638. The high modulus composition was poured into type IV mold dimensions and tested at a strain rate of 0.127 cm per minute on a universal tensile tester. The low modulus composition was poured into type I mold dimensions and tested at a strain rate of 0.635 cm per minute. The dumbbell specimens were aged at 20° C. for one week to obtain initial tensile strengths and aged at 55° C. for two weeks in a dry oven to determine tensile stability with time. Initial and aged breaking stress, breaking strain, and tensile modulus observed is recorded in TABLE 2.

TABLE 1

| Ingredient, wt. % | Example 1 (High Modulus) | Example 2 (Low Modulus) |
|---|---|---|
| HPMA | 68.1 | 30.9 |
| IDMA | 14.6 | 51.5 |
| PAGE | 14.6 | 14.7 |
| WAX | 0.8 | 1.0 |
| Cobalt promoter | 0.6 | 0.6 |
| Aluminum promoter | 1.3 | 1.3 |
|  | 100.0 | 100.0 |

TABLE 2

| PROPERTY | EXAMPLE 1 | EXAMPLE 2 |
|---|---|---|
| Odor | Low | Low |
| Viscosity, cps | 10 | 7.5 |
| Flash point, °F. closed cup | greater than 200 F. (93° C.) | greater than 200 F. (93° C.) |
| Cure time, hours to non-tacky finish | less than 6 hrs | less than 7 hrs |
| Initial Tensile Strength (1 week at 20° C.) | | |
| Break Stress, cps | 9,570 | 1,545 |
| Break Strain, % | 2.5 | 251.4 |
| Modulus, kps | 438,923 | 6,341 |
| Aged Tensile Strength (2 weeks at 55° C.) | | |
| Break Stress, kps | 11,254 | 2,132 |
| Break Strain, % | 2.7 | 152.0 |
| Modulus, kps | 476,417 | 10,087 |

Preferred low modulus compositions of the invention exhibit a break strain after aging (as aged and tested above) of at least about 20%, and more preferably at least about 100%.

What is claimed is:

1. A composition comprising:
   (a) a major amount of hydroxypropyl methacrylate;
   (b) a major amount of $C_8$ to $C_{10}$ alkyl ester of acrylic acid or methacrylic acid;
   (c) a crosslinking agent selected from the group consisting of a polyallyl glycidyl ether resin and dicyclopentyl ethoxy methacrylate;
   (d) a promoter comprising cobalt metal ion; and
   (e) a free-radical initiator for polymerizing components (a), (b) and (c).

2. A composition according to claim 1, wherein monomer (b) is isodecyl methacrylate.

3. A composition according to claim 1, wherein monomer component (a) is present in an amount of about 20 to 80 parts by weight and monomer component (b) is present in an amount of about 80 to 20 parts by weight, both per 100 parts by weight of the total amount of components (a), (b) and (c).

4. A composition according to claim 1, which hardens to provide a material having a tensile modulus of no greater than 50,000 kps after aging at 55° C. for 14 days.

5. A composition according to claim 1 which hardens to provide a material having a tensile modulus of at least 50,000 kps after aging at 55° C. for 14 days.

6. A composition according to claim 1, wherein said promoter further comprises aluminum metal ion.

7. A composition according to claim 1, further comprising a filler having a void volume of less than about 25%.

8. A method of preparing or repairing a surface comprising applying a composition according to claim 1 to a substrate and allowing said composition to harden through polymerization of said components (a), (b) and (c).

9. A hardened article fabricated from a composition according to claim 1.

* * * * *